(12) United States Patent
Miura et al.

(10) Patent No.: US 10,741,886 B2
(45) Date of Patent: Aug. 11, 2020

(54) LITHIUM-ION BATTERY FORMATION PROCESS

(71) Applicants: TOYOTA MOTOR EUROPE, Brussels (BE); TOYOTA JIDOSHA KABUSHIKI KAISHA, Toyota-shi, Aichi-ken (JP)

(72) Inventors: Takashi Miura, Brussels (BE); Stephane Cotte, Brussels (BE); Kitayoshi Masanori, Toyota (JP)

(73) Assignees: TOYOTA MOTOR EUROPE, Brussels (BE); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/315,741

(22) PCT Filed: Feb. 22, 2017

(86) PCT No.: PCT/EP2017/054090
§ 371 (c)(1),
(2) Date: Jan. 7, 2019

(87) PCT Pub. No.: WO2018/153449
PCT Pub. Date: Aug. 30, 2018

(65) Prior Publication Data
US 2019/0372177 A1 Dec. 5, 2019

(51) Int. Cl.
*H01M 10/058* (2010.01)
*H01M 10/44* (2006.01)
(Continued)

(52) U.S. Cl.
CPC ..... *H01M 10/446* (2013.01); *H01M 10/0525* (2013.01); *H01M 10/0567* (2013.01);
(Continued)

(58) Field of Classification Search
CPC ........... H01M 10/446; H01M 10/0525; H01M 10/0567; H01M 10/4235; H01M 10/48;
(Continued)

(56) References Cited

U.S. PATENT DOCUMENTS

2004/0157133 A1* 8/2004 Kim ................. H01M 10/0525
429/326
2014/0159674 A1  6/2014 Genies et al.
(Continued)

FOREIGN PATENT DOCUMENTS

EP  3 093 914 A1  11/2016
JP  2014-512661 A  5/2014
(Continued)

OTHER PUBLICATIONS

International Search Report for PCT/EP2017/054090 dated May 9, 2017 [PCT/ISA/210].
(Continued)

*Primary Examiner* — Cynthia K Walls
(74) *Attorney, Agent, or Firm* — Sughrue Mion, PLLC

(57) ABSTRACT

A method of preparing a lithium-ion cell (10), the method including providing to an electrolyte (22) of the cell, an additive configured to improve formation of a solid electrolyte interface (24) on an anode (12), charging the cell (10) at a first predetermined charge rate (C1) up to a first predetermined voltage (V1), wherein the first predetermined voltage (V1) corresponds to a voltage at which the additive begins formation of the solid electrolyte interface (24), charging the cell (10) at a second predetermined rate (C2) to a second predetermined voltage (V2), wherein the second predetermined voltage (V2) corresponds to a voltage at which the electrolyte (22) begins formation of the solid electrolyte interface (24); and charging the cell (10) to a fully charged capacity at a third predetermined charge rate
(Continued)

(C3), the third charge rate (C3) being greater than the second charge rate (C2).

8 Claims, 3 Drawing Sheets

(51) Int. Cl.
 *H01M 10/0525* (2010.01)
 *H01M 10/0567* (2010.01)
 *H01M 10/42* (2006.01)
 *H01M 10/48* (2006.01)

(52) U.S. Cl.
 CPC ....... *H01M 10/4235* (2013.01); *H01M 10/48* (2013.01); *H01M 2220/20* (2013.01); *H01M 2300/0025* (2013.01)

(58) Field of Classification Search
 CPC ..... H01M 2220/20; H01M 2300/0025; H01M 2300/0028; H01M 10/052; Y02E 60/122
 See application file for complete search history.

(56) References Cited

U.S. PATENT DOCUMENTS

| | | |
|---|---|---|
| 2015/0060290 A1 | 3/2015 | Xu |
| 2016/0329613 A1 | 11/2016 | Kusachi et al. |
| 2017/0040650 A1 | 2/2017 | Schmitz et al. |

FOREIGN PATENT DOCUMENTS

| | | |
|---|---|---|
| KR | 10-2016-0095050 A | 8/2016 |
| WO | 2015/104933 A1 | 7/2015 |

OTHER PUBLICATIONS

Written Opinion for PCT/EP2017/054090 dated May 9, 2017 (PCT/ISA/237).

Notice of Reasons for Rejection dated Feb. 18, 2020, from the Japanese Patent Office in Application No. 2019-500534.

Notification of Reason for Refusal dated Mar. 20, 2020, from the Korean Intellectual Property Office in Application No. 10-2019-7000653.

\* cited by examiner

LITHIUM-ION BATTERY FORMATION PROCESS

CROSS REFERENCE TO RELATED APPLICATIONS

This application is a National Stage of International Application No. PCT/EP2017/054090, filed on Feb. 22, 2017.

FIELD OF THE DISCLOSURE

The present disclosure is related to lithium ion batteries or cells, and more particularly to an improved method for initially charging such batteries (SEI formation process).

BACKGROUND OF THE DISCLOSURE

Lithium-ion batteries are part of a family of rechargeable battery types in which lithium ions move from the negative electrode to the positive electrode during discharge and from the positive electrode to the negative electrode when charging.

There are various types of lithium-ion battery. The anode comprises generally carbon and the cathode comprises a lithium compound. The anode and the cathode are separated by a separator made from a porous polymer, such as a micro-perforated plastic sheet, which allows ions to pass through. The anode, cathode and separator are immersed in an electrolyte.

Lithium-ion batteries may be classified according to the cathode material.

Once the lithium-ion battery is assembled, before the battery is suitable to be used, the lithium-ion battery may be put through at least one precisely controlled charge/discharge cycle to activate the working material. This step is called the formation process. This formation process provides an initial full charge of the battery.

During the formation process, a solid electrolyte interface (SEI) is formed on the anode. High-quality SEI formation is desirable for performance and life of the lithium-ion battery or cell.

Methods for initial charging, i.e., for the formation process, of a lithium-ion battery have been proposed.

Typically, the battery is charged at a constant charge rate (i.e., constant current). The charge rate is also expressed as a C-rate, which represents a charge or a discharge rate equal to the capacity of a battery in one hour. It has been found that high-quality SEI is formed at small C-rates, which means that the initial charging is performed over an extended period of time.

Indeed, fully charging a battery at a C-rate equal to C/5 would take approximately five hours. According to some available techniques, the battery is charged at a small C-rate up to the fully charged voltage of the battery in order for the SEI to form on the carbon anode during the first charge and then the battery is held constant at the fully charged voltage until the current drops below a threshold. The battery is then left to rest for two hours and is discharged at a small C-rate to a pre-set voltage, i.e., the discharge cut-off voltage. This formation process may be cycled at least once.

In order to reduce the manufacturing time of lithium-ion batteries, so-called dynamic forming processes have been proposed. In such processes, the battery is charged at a small C-rate up to the end of SEI layer formation on the anode, corresponding to a threshold voltage value, and then, a large C-rate is used to charge the battery up to the fully charged voltage. For example US 2015/060290 discloses such a formation protocol which still involves at least charging the battery up to the fully charged voltage at least twice, and resting the cell for two hours between each charge/discharge of the cell, the total duration of the dynamic formation process being greater than forty hours. However, in US 2015/060290, the voltage value at termination of SEI layer formation on the anode is determined by a method using differences of temperature, and this determination can be inaccurate and based on approximations. This may be particularly true where an SEI layer is relatively small.

Additives have also been added to the electrolyte to improve the formation of the SEI and therefore enhancing the anode stability.

SUMMARY OF THE DISCLOSURE

The present inventors have recognized that it remains desirable to reduce the duration of a formation process for an SEI, while having a battery that will exhibit good properties over a large number of charge/discharge cycles.

Therefore, according to embodiments of the present disclosure, a method of performing a formation process for a lithium-ion cell is provided, the method including, providing to an electrolyte of the cell, an additive configured to improve formation of a solid electrolyte interface on an anode, charging the cell at a first predetermined charge rate up to a first predetermined voltage, wherein the first predetermined voltage corresponds to a voltage at which the additive begins formation of the solid electrolyte interface, charging the cell at a second predetermined rate to a second predetermined voltage, wherein the second predetermined voltage corresponds to a voltage at which the electrolyte begins formation of the solid electrolyte interface, and charging the cell to a fully charged capacity at a third predetermined charge rate, the third charge rate being greater than the second charge rate.

The present method enables formation of a high-quality SEI from an SEI-forming additive, while minimizing the time used for an initial preparation charge. This further results in a battery having a high capacity retention with reduced production time, thereby translating to cost savings.

The first predetermined voltage and the second predetermined voltage may be determined based on acoustic emission signals.

The first charge rate may be greater than or equal to 2 C, preferably greater than or equal to 2.5 C, more preferably equal to 3 C.

The second charge rate may be less than or equal to 1 C, preferably less than or equal to 0.5 C, more preferable less than or equal to 0.3 C.

The third predetermined charge rate may be greater than or equal to the first predetermined charge rate.

The additive provided in the electrolyte may be selected from an oxalate salt, an ethylene carbonate, and a sulfone.

During charging of the cell, acoustic emission signals received from a sensor on a case of the cell may be measured and/or counted and, based on a number of received signals, the first predetermined voltage determined.

According to another embodiment of the present disclosure, a vehicle comprising one or more cells prepared using the method described above is provided.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
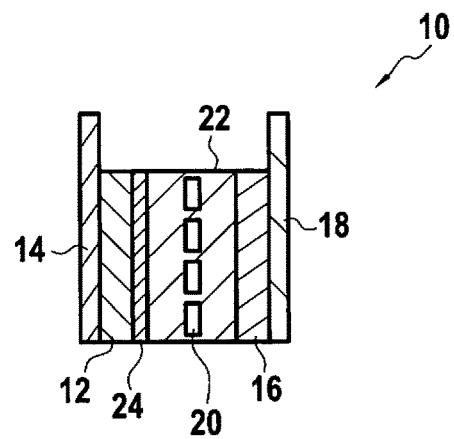
FIG. 1 shows a schematic representation of an exemplary lithium ion cell.

FIG. 1 shows a schematic representation of an exemplary lithium ion cell 10. The lithium ion cell 10 includes an anode 12 fixed on an anode current collector 14 and a cathode 16 fixed on a cathode current collector 18. The anode 12 and the cathode 16 are separated by a separator 20, the anode 12, the cathode 16 and the separator 20 being immersed in an electrolyte 22.

According to exemplary embodiments, anode 12 may comprise a carbon material, anode current collector 14 may comprise copper, cathode 16 may comprise an intercalated lithium compound, and cathode current collector 18 may comprise aluminum. Lithium ions present in the electrolyte 22 move from the anode 12 to the cathode 16 during discharge of the cell 10 and from the cathode 16 to the anode 12 when charging the cell 10.

One or more SEI-forming additives may be added to the electrolyte 22 to aid in formation of SEI 24.

According to some embodiments, one or more SEI-forming additives provided in the electrolyte 22 may be selected from at least one of an oxalate salt, an ethylene carbonate and/or a sulfone.

Examples of oxalate salts may include lithium salts of:

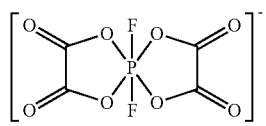
(1)

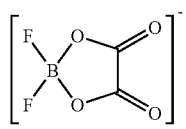
(2)

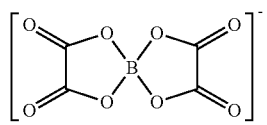
(3)

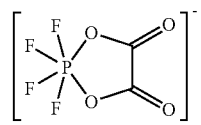
(4)

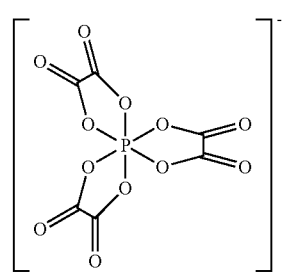
(5)

(1) is difluoro(oxalate)phosphate.

(2) is difluoro(oxalato)borate (3) is bis(oxalato)borate.

(4) is tetrafluoro(oxalato)phosphate.

(5) is tris(oxalato)phosphate.

Examples of ethylene carbonate may include:

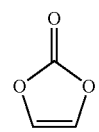
(6)

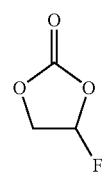
(7)

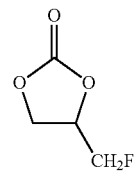
(8)

(6) is vinylene carbonate.

(7) is fluoroethylene carbonate.

(8) is (fluoromethyl)ethylene carbonate.

Examples of sulfone may include:

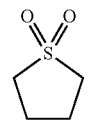
(9)

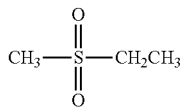

(10)

(9) is sulfolane.

(10) is ethyl methyl sulfone.

In one exemplary cell according to the present disclosure, anode 12 may comprise graphite (e.g., fabricated from a powder having an average particle size of ~10 μm), cathode 16 may comprise $LiNo_{1/3}Co_{1/3}Mn_{1/3}O_2$ and separator 20 may comprise a film of polyethylene. The electrolyte 22 may be a mixture of ethylene carbonate, dimethyl carbonate and ethyl methyl carbonate present in equal volume ratio. The electrolyte may also comprise $LiPF_6$ at 1 mol/L (mole/litre). The SEI-forming additive may be a lithium difluoro(oxalate) phosphate salt added to the electrolyte 22 at 5 wt % (weight percent).

On anode 12, a solid electrolyte interface (SEI) 24 may be formed during a charging process. The SEI 24 may be formed during the formation process of the cell 10, i.e., during the initial charging of the cell 10.

It is to be noted that an SEI may be formed both by an SEI-forming additive present in the electrolyte, and by a certain level of SEI formation from the electrolyte itself. When referring to SEI generally, it is intended to include the conglomerate SEI layer, i.e., both from the SEI-forming additive and the electrolyte. When referring to a specific portion of an SEI layer formed from the SEI-forming additive, reference numeral 24 will be used to refer to the SEI-forming additive portion formed from SEI-forming additive present in the electrolyte 22. Similarly, reference numeral 26 will refer to the SEI formed from the electrolyte 22 itself. One of the desired effects of embodiments of the present disclosure is to minimize formation of SEI 26 from the electrolyte 22.

Figure 2A:
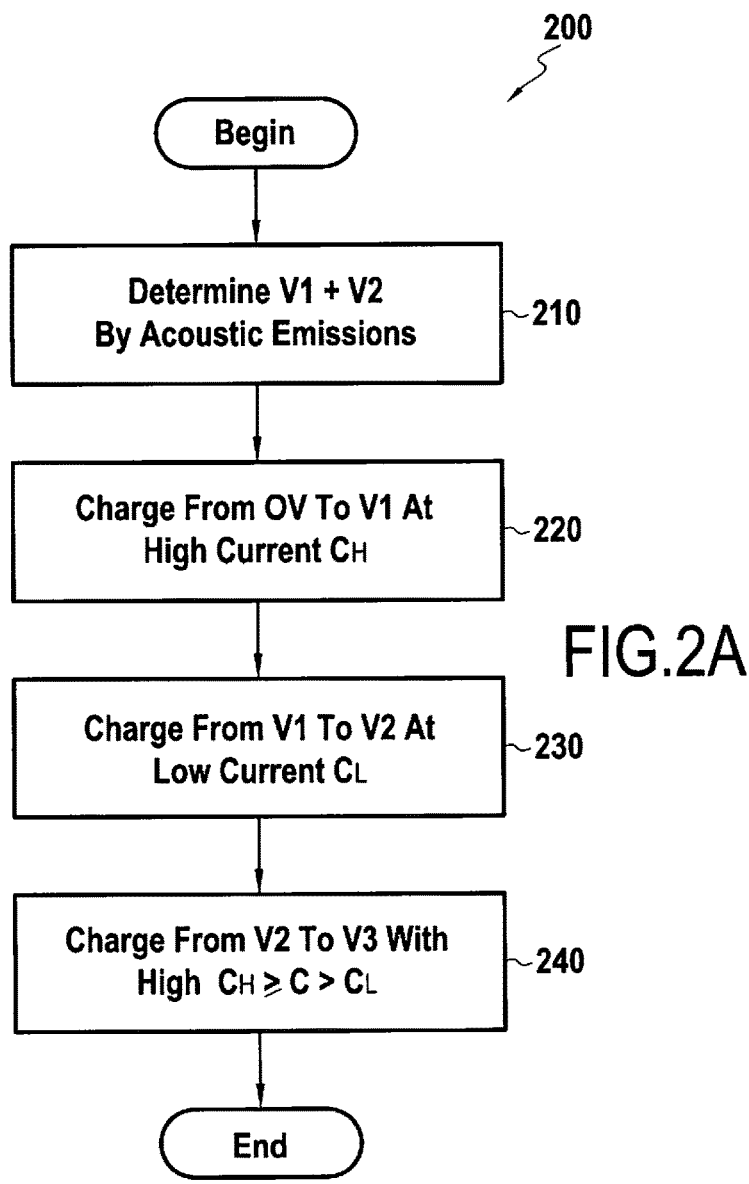
FIG. 2A is a flowchart highlight an exemplary method according to embodiments of the present disclosure.
Figure 2B:
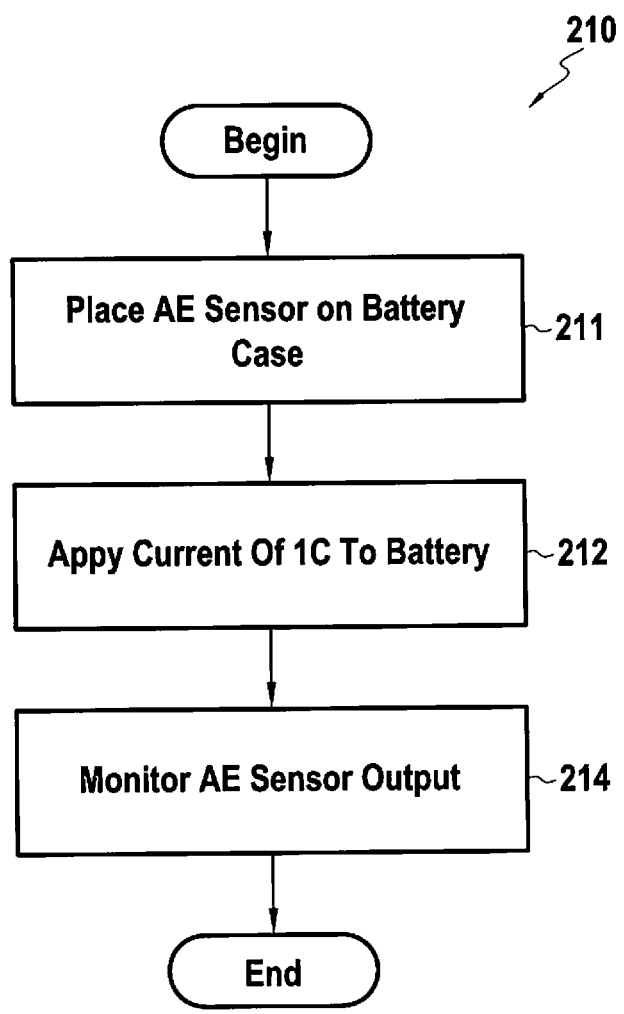
FIG. 2B is a flowchart highlighting an exemplary pre-test method according to the present disclosure.

FIG. 2A shows a block diagram illustrating an exemplary method for preparing a cell according to embodiments of the present disclosure, while FIG. 2B shows an exemplary method associated with step 210 of FIG. 2A in greater detail.

According to some embodiments, a pre-test may be performed to obtain voltage values, $V_1$ and $V_2$, that are to be used during subsequent charging processes according to the present disclosure for similarly configured cells 10 (step 210). In other words, where a manufacturing process is being configured for cells 10 having a similar composition/configuration, one or more pre-tests may be carried out on such a cell design using a first cell having no SEI-forming additives to determine voltage $V_2$, and a second cell having the desired SEI-forming additives for determining voltage $V_1$, and the voltage values carried forward for preparation processes for subsequently produced cells 20 of similar design.

To carry out a pre-test on a particular cell configuration, an acoustic emission sensor (AES) may be placed on a case of the cell (10), for example, as near as possible to a geometric center of the case (step 211, FIG. 2B). Such an AES may comprise, for example, a piezoelectric transducer (e.g., R15 from Physical Acoustics Corp., resonant frequency of 175 kHz, frequency range of 50-200 Hz). One of skill understands that more than one AES may be used, as desired, and for minimizing costs and complexity one such sensor is discussed here.

The AES may be connected to an acoustic emission measuring system, for example, a multi-channel AE monitoring system from Mistras Group SA, as well as pre-amplifiers (e.g., 60 dB gain) and band-pass filters, for example, with a range between 100 kHz and 1 MHz). A threshold value for removing noise may be set at, for example, 27 dB.

Separate charging processes of the cell 10 having no SEI-forming additive and the cell 10 having an SEI-forming additive may then be performed, each, for example, at a charge rate of 1 C (step 212, FIG. 2B), and the acoustic emissions and voltage for each cell monitored (step 214, FIG. 2B).

Figure 3:
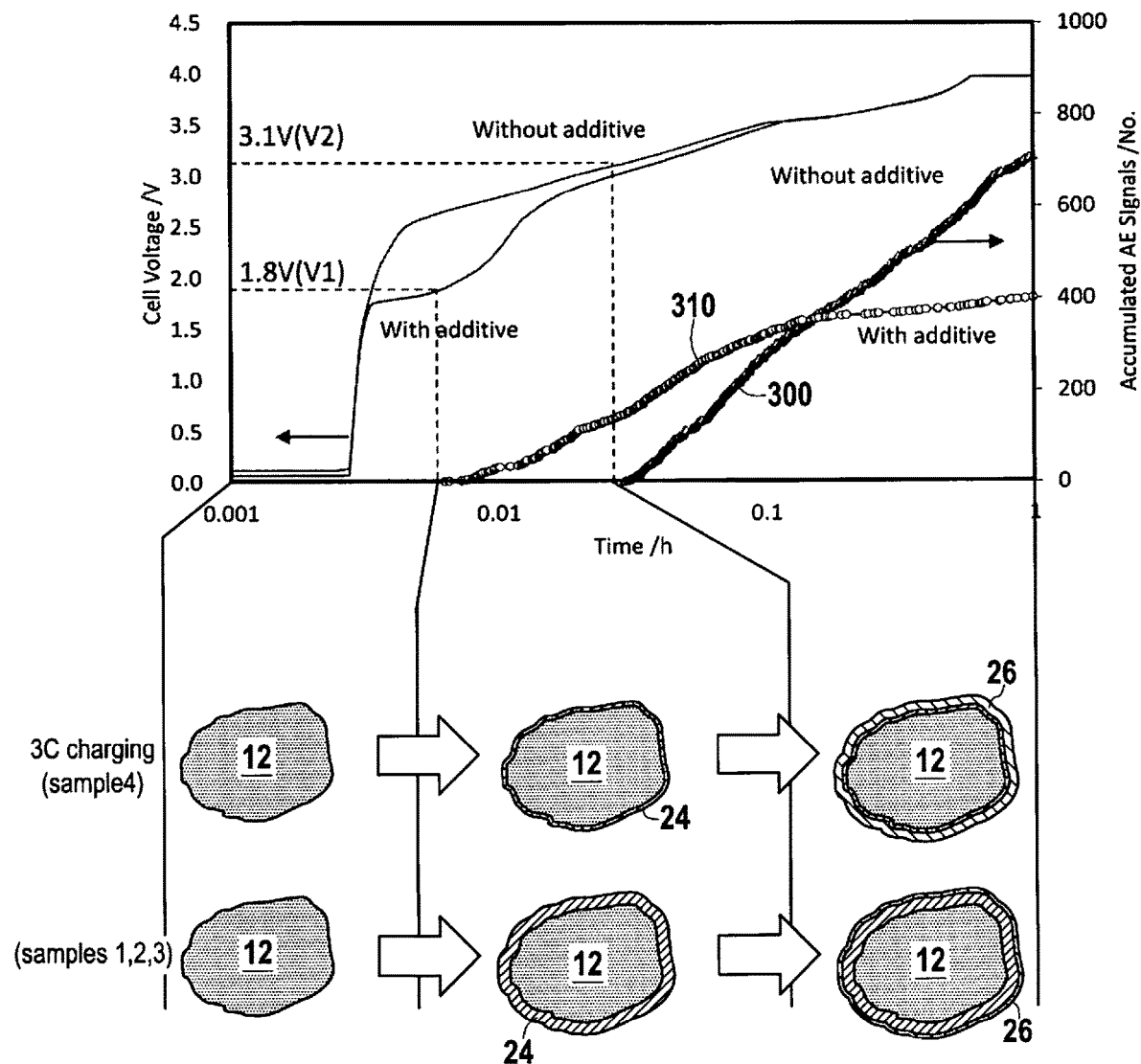
FIG. 3 is a graph showing acoustic emissions and voltages for an exemplary batter of the present disclosure.

FIG. 3 is a graph plotting acoustic emission and voltage information for a pretest of exemplary cells 10, one having no SEI-forming additive, and a second having a desired SEI-forming additive therein, according to the present disclosure.

As shown at FIG. 3, line 300, acoustic emissions begin to be detected at around 3.1V for the cell 10 having no SEI-forming additive in the electrolyte. These acoustic emissions correspond to the voltage at which the SEI 26 begins formation from the electrolyte, i.e., $V_2$, and in the present example $V_2$ is determined to be 3.1V.

Similarly, in the cell 10 including the SEI-forming additive in the electrolyte, line 310 demonstrates that acoustic emissions begin to be detected at around 1.8V, which corresponds to formation of SEI 24 by the SEI-forming additive. This voltage then corresponds to $V_1$.

A fully charged voltage for a single lithium-ion cell is approximately 4V, and this voltage then corresponds to $V_3$, i.e., a fully charged state.

Once V1 and V2 have been determined for a particular cell design, the cell formation process can proceed for subsequent cells 10 using these same voltage values for V1 and V2. Therefore, a cell 10 including one or more SEI-forming additives can be charged from its assembly voltage to $V_1$ quickly, for example, at a rate of 3 C (step 220). During this time, little to no SEI formation should occur.

The cell can then be charged from $V_1$ to $V_2$ at a reduced rate, for example, 0.1 C to 0.3 C, during which time the SEI-forming additive should form SEI 24 on the anode 12 of the cell 10 (step 230).

After reaching $V_2$, the cell may then be charged quickly again, for example, at 3 C, up to the final voltage $V_3$, i.e., approximately 4 volts (step 240). During this time, little to no formation of SEI 26 may occur, depending on a configuration of a cell 10 being charged.

EXAMPLES

Five sample cells 10 having the same components were prepared according to the present disclosure for testing at varying charge rates. These cells were configured as follows:
Cathode: LiNi1/3Co1/3Mn1/3O2;
   conductive material—acetylene black;
   binder—poly vinylidine difluoride (PVDF)
Anode: active material—graphite;
binder—styrene butadiene rubber (SBR), carboxymethyl cellulose (CMC)
Separator: polyethylene film
Electrolyte: EC:DMC:EMC=1:1:1 by volume with LiPF6 1 mol/L;
SEI-forming additive—Lithium difluoro(oxalate) phosphate 5% by weight.

A pre-test for this particular design was then performed according to the pre-test procedures described above to determine the first and second voltages $V_1$ and $V_2$, respectively. $V_1$ was determined to be equal to 1.8V and $V_2$=3.1V. $V_3$ is known for a lithium ion cell, and is equal to ~4.0V.

Charging was then performed for each sample according to Table 1, and the resulting capacity retention recorded in this table.

TABLE 1

| | 1st Step Current rate | V1 | 2nd Step Current rate | V2 | 3rd Step Current rate | V3 | Charging Time (min) | Capacity retention (%) |
|---|---|---|---|---|---|---|---|---|
| Sample1 | 3 C | 1.8 V | 1 C | 3.1 V | 3 C | 4.0 V | 21 | 91 |
| Sample2 | 3 C | | 0.3 C | | 3 C | | 25 | 92 |
| Sample3 | 3 C | | 0.1 C | | 3 C | | 34 | 93 |
| Sample4 | 3 C | | 3 C | | 3 C | | 20 | 87 |
| Sample5 | 1 C | | 1 C | | 1 C | | 60 | 81 |

Capacity retention was calculated using equation 11:

$$CR = ((\text{First discharge capacity})/(\text{Discharge capacity after cycle test}))*100(\%) \quad (11)$$

The cycle test mentioned in equation 11 involves 500 charge/discharge cycles of a cell between 3 volts and 4 volts, at room temperature, where the charge and discharge are each performed at a rate of 2 C.

As shown at Table 1, Sample 4 was rapidly charged at 3 C during all phases, while Sample 5 was charged at a constant 1 C through all phases. Sample 4 capacity retention results demonstrate that rapidly charging through all phases results in relatively poor capacity retention. Similarly, Sample 5 capacity retention results demonstrate that constant charging at the relatively low rate of 1 C through all phases also yields below desirable levels of retention.

Sample 1 results indicate that rapid charging at 3 C to V1 followed by slow charging at 1 C to V2, and rapid charging again at 3 C from V2 to V3, can improve retention over sample 4, but retention was not significantly different than Sample 5.

Samples 2 and 3, however, demonstrate significant gains in retention capacity where a rapid 3 C charging to V1, followed by a reduced rate charge (e.g., 0.1 C-0.3 C) from V1 to V2, and a rapid 3 C charge from V2 to V3 are used. As shown at FIG. 3, bottom portion, this is due to the relatively greater formation of SEI 24 from the SEI-forming additive, and minimized SEI 26 formation from the electrolyte itself.

Thus, the inventors have demonstrated that formation of a high quality SEI with good capacity retention can be achieved with a relatively short duration of formation process by way of embodiments of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The method is described in terms of a single cell. However, it may be easily adapted for batteries having multiple cells.

The invention claimed is:

1. A method of preparing a lithium-ion cell, the method comprising:
   providing to an electrolyte of the cell, an additive configured to improve formation of a solid electrolyte interface on an anode;
   charging the cell at a first predetermined charge rate up to a first predetermined voltage, wherein the first predetermined voltage corresponds to a voltage at which the additive begins formation of the solid electrolyte interface;
   charging the cell at a second predetermined rate to a second predetermined voltage, wherein the second predetermined voltage corresponds to a voltage at which the electrolyte begins formation of the solid electrolyte interface; and
   charging the cell to a fully charged capacity at a third predetermined charge rate, the third charge rate being greater than the second charge rate.

2. The method according to claim 1, wherein the first predetermined voltage and the second predetermined voltage are determined based on acoustic emission signals.

3. The method according to claim 1, wherein the first charge rate is greater than or equal to 2 C, preferably greater than or equal to 2.5 C, more preferably equal to 3 C.

4. The method according to claim 1, wherein the second charge rate is less than or equal to 1 C, preferably less than or equal to 0.5 C, more preferable less than or equal to 0.3 C, for example 0.1 C.

5. The method according to claim 1, wherein the third predetermined charge rate is greater than or equal to the first predetermined charge rate.

6. The method according to claim 1, wherein the additive provided in the electrolyte is selected from an oxalate salt, an ethylene carbonate, and a sulfone.

7. The method according to claim 1, comprising:
   during charging of the cell, measuring acoustic emission signals received from a sensor within a case of the cell;
   determining, based on a number of received signals, the first predetermined voltage.

8. A vehicle comprising a battery prepared using the method according to claim 1.

* * * * *